US012225612B2

United States Patent
Wang et al.

(10) Patent No.: US 12,225,612 B2
(45) Date of Patent: Feb. 11, 2025

(54) DUAL CONNECTION RE-ESTABLISHMENT METHOD, READABLE STORAGE MEDIUM, AND BASE STATION

(71) Applicant: ZTE Corporation, Shenzhen (CN)

(72) Inventors: Juntao Wang, Shenzhen (CN); Gaopeng Du, Shenzhen (CN); Xueying Huang, Shenzhen (CN); Wei Si, Shenzhen (CN); Rui Liu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 353 days.

(21) Appl. No.: 17/776,128

(22) PCT Filed: Oct. 29, 2020

(86) PCT No.: PCT/CN2020/124988
§ 371 (c)(1),
(2) Date: May 11, 2022

(87) PCT Pub. No.: WO2021/093599
PCT Pub. Date: May 20, 2021

(65) Prior Publication Data
US 2022/0304095 A1 Sep. 22, 2022

(30) Foreign Application Priority Data
Nov. 13, 2019 (CN) .......................... 201911107547.0

(51) Int. Cl.
| | | |
|---|---|---|
| *H04W 76/19* | (2018.01) | |
| *H04W 76/15* | (2018.01) | |
| *H04W 76/20* | (2018.01) | |

(52) U.S. Cl.
CPC ........... *H04W 76/19* (2018.02); *H04W 76/15* (2018.02); *H04W 76/20* (2018.02)

(58) Field of Classification Search
CPC ...... H04W 76/15; H04W 76/19; H04W 76/20
See application file for complete search history.

(56) References Cited

U.S. PATENT DOCUMENTS

2016/0373975 A1* 12/2016 Xu .......................... H04W 76/30
2017/0013532 A1* 1/2017 Olofsson ............... H04W 76/18
(Continued)

FOREIGN PATENT DOCUMENTS

| CN | 110324848 A | 10/2019 |
|---|---|---|
| WO | 2014031989 A1 | 2/2014 |

(Continued)

OTHER PUBLICATIONS

3GPP Technical Specification Group Radio Access Network. "Change Request: Data volume reporting for MR-DC with 5GC," 3GPP TSG-RAN WG3 Meeting #103, Mar. 2019, pp. 1-16.
(Continued)

*Primary Examiner* — Brian P Cox
(74) *Attorney, Agent, or Firm* — Vivacqua Crane, PLLC

(57) ABSTRACT

A dual connection re-establishment method, a non-transitory computer-readable storage medium, and a node are disclosed. The dual connection re-establishment method may include: sending a configuration information request to a target secondary node (SN) in response to a RRC connection re-establishment completion instruction sent by a UE (S1); receiving first configuration information fed back by the target SN (S2); and sending the first configuration information, and second configuration information corresponding to the MN to the UE for the UE to complete the RRC connection reconfiguration with the MN and the target SN according to the first configuration information and the second configuration information (S3).

12 Claims, 8 Drawing Sheets

(56) References Cited

U.S. PATENT DOCUMENTS

2017/0181216 A1    6/2017  Worrall et al.
2018/0270682 A1*   9/2018  Zacharias ............. H04W 24/10

FOREIGN PATENT DOCUMENTS

WO    WO-2015139763 A1 *  9/2015  ........ H04W 74/0833
WO       2018138379 A1    8/2018
WO       2019031948 A1    2/2019

OTHER PUBLICATIONS

3GPP Technical Specification Group Radio Access Network. "Resumption of SCG configuration with RRC Re-establishment and RRC resume," 3GPP TSG-RAN WG2 Meeting #106, May 2019, pp. 1-4.

Industrial Property Cooperation Center (IPCC). Search Report for JP Application No. 2022-527870 and English translation, mailed Apr. 24, 2023, pp. 1-62.

Japan Patent Office. Notice of Reasons for Refusal for JP Application No. 2022-527870 and English translation, mailed May 9, 2023, pp. 1-6.

International Searching Authority. International Search Report and Written Opinion for PCT Application No. PCT/CN2020/124988 and English translation, mailed Jan. 27, 2021, pp. 1-9.

European Patent Office. Extended European Search Report for EP Application No. 20888286.0, mailed Dec. 5, 2022, pp. 1-9.

* cited by examiner

DUAL CONNECTION RE-ESTABLISHMENT METHOD, READABLE STORAGE MEDIUM, AND BASE STATION

CROSS-REFERENCE TO RELATED APPLICATION

This application is a national stage filing under 35 U.S.C. § 371 of international application number PCT/CN2020/124988, filed Oct. 29, 2020, which claims priority to Chinese patent application No. 201911107547.0, filed on Nov. 13, 2019. The contents of these applications are incorporated herein by reference in their entirety.

TECHNICAL FIELD

Embodiments of the present disclosure relate to the field of communication, and in particular, to a dual connection re-establishment method, a non-transitory computer-readable storage medium, and a node.

BACKGROUND

In the process of dual connection service, the master node (MN) triggers the re-establishment due to air interface quality or other configuration factors. The current protocol definition requires the release of the source secondary node (SN), and the dual connection configuration processing flow in the re-establishment process is not clearly stated. The existing dual connection re-establishment configuration process takes a long time and has a large interruption delay.

In addition, in the related process of implementing dual connection re-establishment, the addition of SNs is performed according to a pre-configured secondary node strategy in the MN after the cell of the MN is restored. That is, after the MN completes the radio resource control (RRC) connection re-establishment and reconfiguration process with a user equipment (UE), the MN determines a target SN to be connected through a certain secondary node selection strategy. Then, the MN requests relevant matching information from the target SN, and sends the configuration information of the target SN to the UE for the UE to complete the reconfiguration with the target SN, so as to implement the dual connection re-establishment.

In practical application, it is found that the above-mentioned dual connection re-establishment process takes a long time and has a large interruption delay, which leads to a sharp drop in user throughput.

SUMMARY

In view of the above, embodiments of the present disclosure provide a dual connection re-establishment method, a non-transitory computer-readable storage medium, and a node.

In accordance with an aspect of the present disclosure, an embodiment of the present disclosure provides a dual connection re-establishment method, which is applied to a MN. The dual connection re-establishment method may include: sending a configuration information request to a target secondary node in response to a radio resource control (RRC) connection re-establishment completion instruction sent by a user equipment (EU); receiving first configuration information fed back by the target secondary node; and sending the first configuration information, and second configuration information corresponding to the MN to the EU for the EU to complete the RRC connection reconfiguration with the MN and the target secondary node according to the first configuration information and the second configuration information.

In accordance with an aspect of the present disclosure, an embodiment of the present disclosure further provides a non-transitory computer-readable storage medium storing a program which, when executed by a processor, causes the processor to carry out the method provided by the foregoing embodiment.

In accordance with an aspect of the present disclosure, an embodiment of the present disclosure further provides a node. The node may include one or more processors and a memory storing one or more programs which, when executed by the one or more processors, cause the one or more processors to carry out the method provided by the foregoing embodiments.

In accordance with an aspect of the present disclosure, an embodiment of the present disclosure provides a dual connection re-establishment method, which is applied to a UE side. The dual connection re-establishment method may include: sending an RRC connection re-establishment completion instruction to a MN for the MN to send a configuration information request to a target secondary node and receive first configuration information fed back by the target secondary node; receiving the first configuration information sent by the MN, and second configuration information corresponding to the MN; and completing RRC connection reconfiguration with the MN and the target secondary node according to the first configuration information and the second configuration information.

BRIEF DESCRIPTION OF DRAWINGS

The accompanying drawings are intended to provide a further understanding of the embodiments of the present disclosure, and form part of the description. Together with the embodiments of the present disclosure, the accompanying drawings are intended to illustrate the present disclosure, and do not constitute a limitation on the present disclosure. The above and other features and advantages will become more apparent to those having ordinary skill in the art by describing some detailed embodiments with reference to the accompanying drawings, in which.

DETAILED DESCRIPTION

Figure 1:
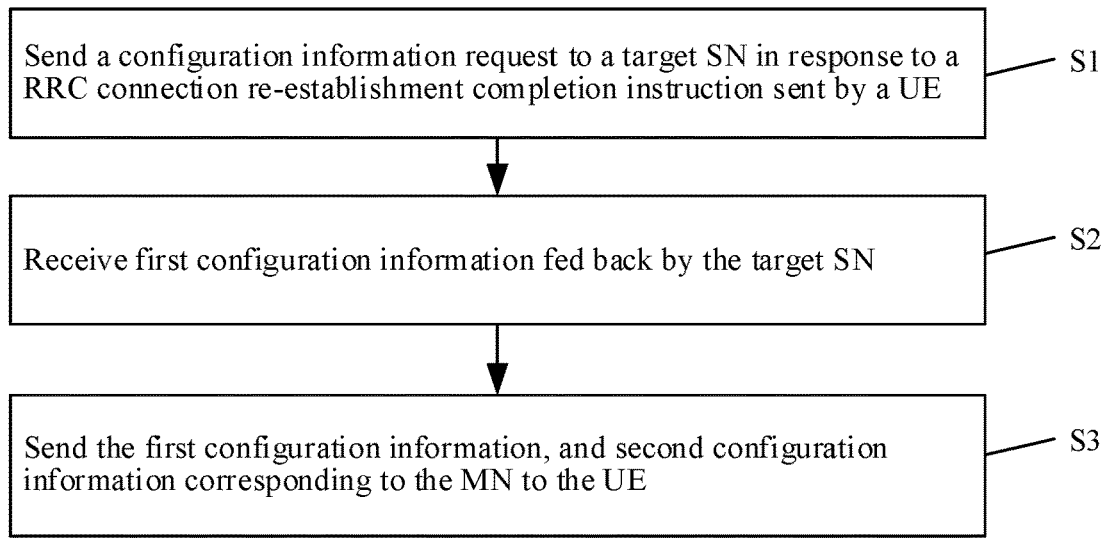
FIG. 1 is a flowchart of a dual connection re-establishment method provided by an embodiment of the present disclosure.

In order to make those having ordinary skill in the art better understand the technical schemes of the present disclosure, a dual connection re-establishment method, a readable storage medium, and a node provided by the embodiments of the present disclosure are described in detail below with reference to the accompanying drawings.

Some embodiments of the present disclosure will be described more fully hereinafter with reference to the accompanying drawings, but the embodiments may be embodied in different forms and should not be construed as limited to the embodiments set forth herein. Rather, these embodiments are provided to make the present disclosure thorough and complete, and will enable those having ordinary skill in the art to fully understand the scope of the present disclosure.

The terms used herein are only intended to describe particular embodiments, and are not intended to limit the present disclosure. As used herein, the singular forms "a", "an" and "the" are intended to include the plural forms as well, unless clearly stated in the context otherwise. It will also be understood that the terms "including" and/or "made of" used in this description specify the presence of said features, integers, steps and/or operations, but do not exclude the presence or addition of one or more other features, integers, steps and/or operations.

It will be understood that although the terms "first", "second", and the like may be used herein to describe various elements, these elements should not be limited by these terms, and these terms are only intended to distinguish one object from another.

Unless otherwise defined, all terms (including technical and scientific terms) used herein have the same meanings as commonly understood by those having ordinary skill in the art. It will also be understood that terms such as those defined in commonly used dictionaries should be construed as having meanings consistent with their meanings in the relevant fields and the background of the present disclosure, and will not be construed as having idealized or overly formal meanings, unless explicitly so defined herein.

In the related process of implementing dual connection re-establishment, the addition of secondary nodes (SNs) is performed according to a pre-configured secondary node strategy in a master node (MN) after the cell of the MN is restored. That is, after the MN completes the radio resource control (RRC) connection re-establishment and reconfiguration process with a user equipment (UE), the MN determines a target SN to be connected through a certain secondary node selection strategy. Then, the MN requests the relevant matching information from the target SN, and sends the configuration information of the target SN to the UE for the UE to complete the reconfiguration with the target SN, so as to implement the dual connection re-establishment.

The "re-establishment" refers to the establishment of signaling radio bearers (SRB) between the UE and the node. The "reconfiguration" refers to the configuration of data radio bearers between the UE and the node.

In practical application, it is found that the above-mentioned dual connection re-establishment process takes a long time and has a large interruption delay, which leads to a sharp drop in user throughput. In view of this, embodiments of the present disclosure provide a dual connection re-establishment method.

FIG. 1 is a flow chart of a dual connection re-establishment method provided by an embodiment of the present disclosure. As shown in FIG. 1, an execution subject of the dual connection re-establishment method is a MN to which the UE is connected when executing dual connection re-establishment, which may be a source MN to which the UE was connected previously or may be a non-source MN. In addition, the target SN to which the UE is connected during the dual connection re-establishment may be the source SN to which the UE was connected previously, or may be a non-source MN. Specific application scenarios will be described in detail later. The dual connection re-establishment method includes steps S1 to S3.

At S1, a configuration information request is sent to a target secondary node (SN) in response to a RRC connection re-establishment completion instruction sent by a UE.

After the UE completes the RRC connection re-establishment with the MN, the UE will send an RRC connection re-establishment completion instruction to the MN to inform the MN that the RRC connection re-establishment process with the UE has been completed.

Different from the related methods, in the embodiment of the present disclosure, when the MN receives the RRC connection re-establishment completion instruction, the MN no longer immediately triggers sending configuration information of the MN to the UE for the reconfiguration process, but sends a configuration information request to the target SN for the target SN to provide corresponding configuration information.

In some embodiments, when the execution subject is the source MN (the MN is not switched) and the target SN is the source SN (the SN is not switched), the configuration information request is sent in a SN modification request (also called secondary base station node modification request) instruction.

In some embodiments, when the execution subject is not the source MN (the MN is switched) or the target SN is not the source SN (the SN is switched), the configuration information request is sent in a SN addition request (also called secondary base station node addition request) instruction.

At S2, first configuration information fed back by the target secondary node is received.

The first configuration information includes configuration parameters of the target SN required for the access process between the UE and the target SN, such as details of secondary cell group (SCG) configuration, Ethernet chips (including Ethernet media access controller (MAC) and physical interface transceiver (PHY)) configuration, and the like.

In some embodiments, when the configuration information request is sent in the SN modification request instruction, the first configuration information is sent and fed back to the MN in the SN modification response instruction.

In some embodiments, when the configuration information request is sent in the SN addition request instruction, the first configuration information is sent and fed back to the MN in the SN addition response instruction.

At S3, the first configuration information, and second configuration information corresponding to the MN are sent to the UE.

The second configuration information corresponding to the MN includes configuration parameters of the MN required for the reconfiguration process between the UE and the MN, such as details of master cell group (MCG) configuration, Ethernet chip configuration, and the like.

The MN sends the first configuration information received in step S2 and corresponding second configuration information to the UE for the UE to complete the reconfiguration with the target SN according to the first configuration information, and complete the reconfiguration with the MN according to the second configuration information, thus completing the dual connection between the UE and the MN and SN. It should be noted that the process of completing the reconfiguration with the MN or the SN according to the configuration information of the MN or the SN belongs to the conventional technology in the art, and will not be described in detail here.

In some embodiments, the first configuration information and the second configuration information are sent in an RRC connection reconfiguration instruction.

In the embodiment of the present disclosure, when the MN receives the RRC connection re-establishment completion instruction, the MN sends a configuration information request to the target SN to provide the corresponding first configuration information, and then sends the first configuration information corresponding to the SN and the second configuration information corresponding to the MN to the UE for the UE to establish a connection with the MN and SN at one time. That is, the dual connection is configured at one time in the re-establishment process, thus effectively reducing the time spent in the dual connection re-establishment process, reducing the interruption delay, and ensuring the throughput of users.

Figure 2:
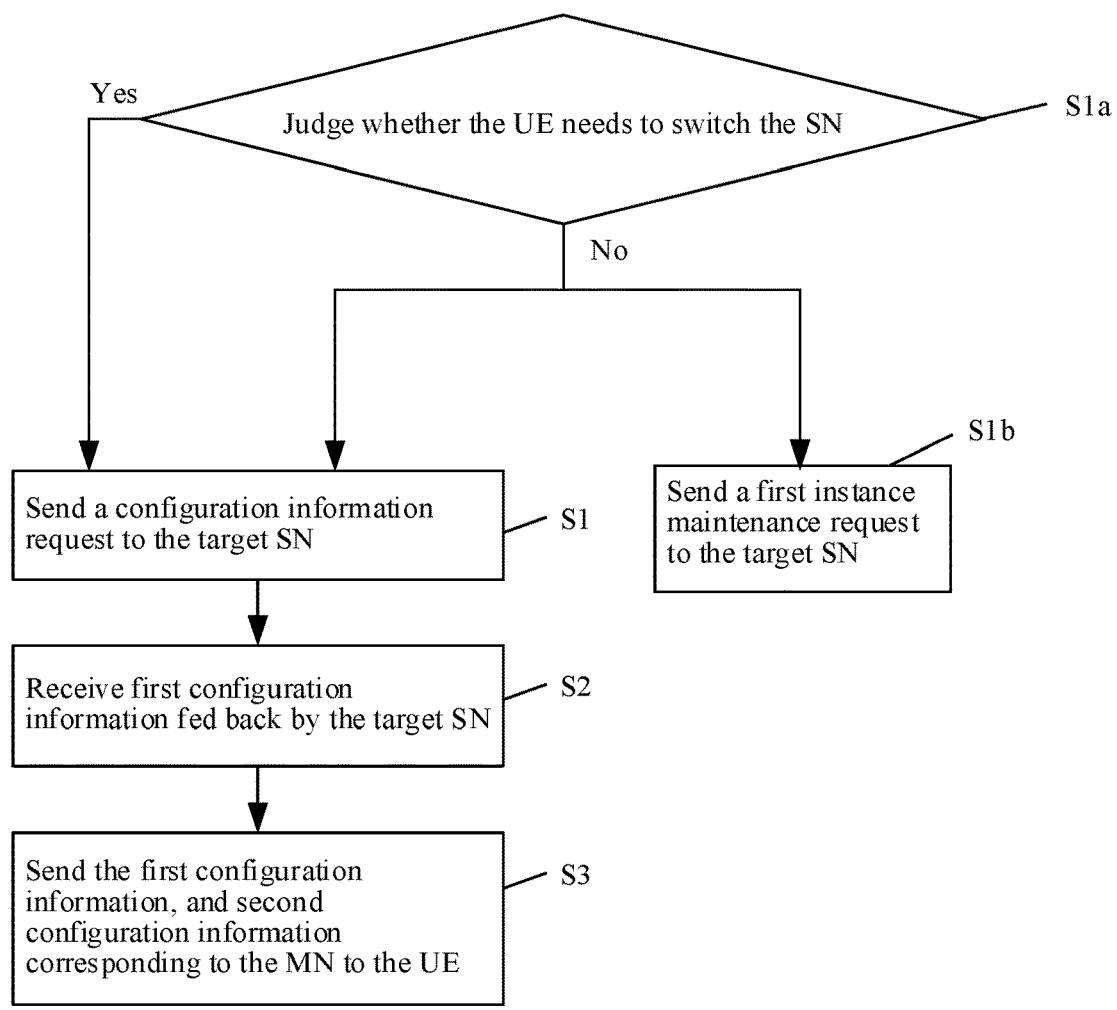
FIG. 2 is a flowchart of another dual connection re-establishment method provided by an embodiment of the present disclosure.

FIG. 2 is a flowchart of another dual connection re-establishment method provided by an embodiment of the present disclosure. As shown in FIG. 2, the method not only includes the above-mentioned steps S1 to S3, but also includes steps S1a and S1b. S1a is executed prior to S1, and S1b may be executed simultaneously with S1.

At S1a, a judgement is made as to whether the UE needs to switch the SN.

In some scenarios, the main possible reasons for the MN triggering the dual connection re-establishment service are that the MN configuration is not supported, or the downlink air interface signal quality of a MN cell is poor. Due to the difference in cell frequency band coverage between MN and SN sites, when the signal quality of the MN cell is poor, the signal quality of the SN cell is not necessarily poor. At this time, state processing of the SN needs to be considered when the MN triggers re-establishment. In addition, due to the movement of the UE, the re-establishment of the MN may be performed in a source cell of the source MN or in other cells of the source MN. In most cases, a good connection is maintained between the NR and the UE, otherwise, the UE will report an indication indicative of NR SCG failure to the MN.

For the above-mentioned scenario, the MN may judge whether the UE needs to switch SN based on a predefined judgment strategy. For example, if the signal quality of the source NR cell is good, there is no need to switch the SN; and if the signal quality of the source SN cell is poor (the UE reports NR SCG failure), it is necessary to switch SN. It should be noted that the judging strategy used for judging whether the UE needs to switch the SN may be preset and adjusted according to actual needs, which is not limited in the present disclosure.

When a determination is made in S1a that the UE does not need to switch the SN, the source SN to which the UE was connected previously is determined as the target SN, and then S1b and S1 are executed simultaneously. When a determination is made in S1a that the UE needs to switch the SN, the target SN may be determined according to the preset SN selection strategy, and then only S1 is executed without executing S1b.

At S1b, a first instance maintenance request is sent to the target SN.

At S1, a configuration information request is sent to the target SN.

After a determination is made that the target SN is the source SN, S1b and S1 may be executed synchronously. In some embodiments, the first instance maintenance request and the configuration information request are sent together in the SN modification request instruction. After receiving the SN modification request instruction, the source SN maintains the UE instance and allocates a new configuration in response to the first instance maintenance request, generates first configuration information, and feeds back the first configuration information to the MN through the SN modification response instruction.

For a scenario where the SN is unchanged, in the technical schemes of the embodiments of the present disclosure, the UE instance is maintained unchanged by controlling the source SN, so that back transmission is not required, thereby reducing the service interruption delay.

After a determination is made that the target SN is not the source SN, only S1 is executed without executing S1b. In some embodiments, the configuration information request is sent in the SN modification request instruction. In this case, the SN modification request instruction does not include the first instance maintenance request. After receiving the SN modification request instruction, the target SN creates a new UE instance and allocates a new configuration, generates first configuration information, and feeds back the first configuration information to the MN through the SN modification response instruction.

At S2, the first configuration information fed back by the target SN is received.

At S3, the first configuration information, and second configuration information corresponding to the MN are sent to the UE.

Figure 3:
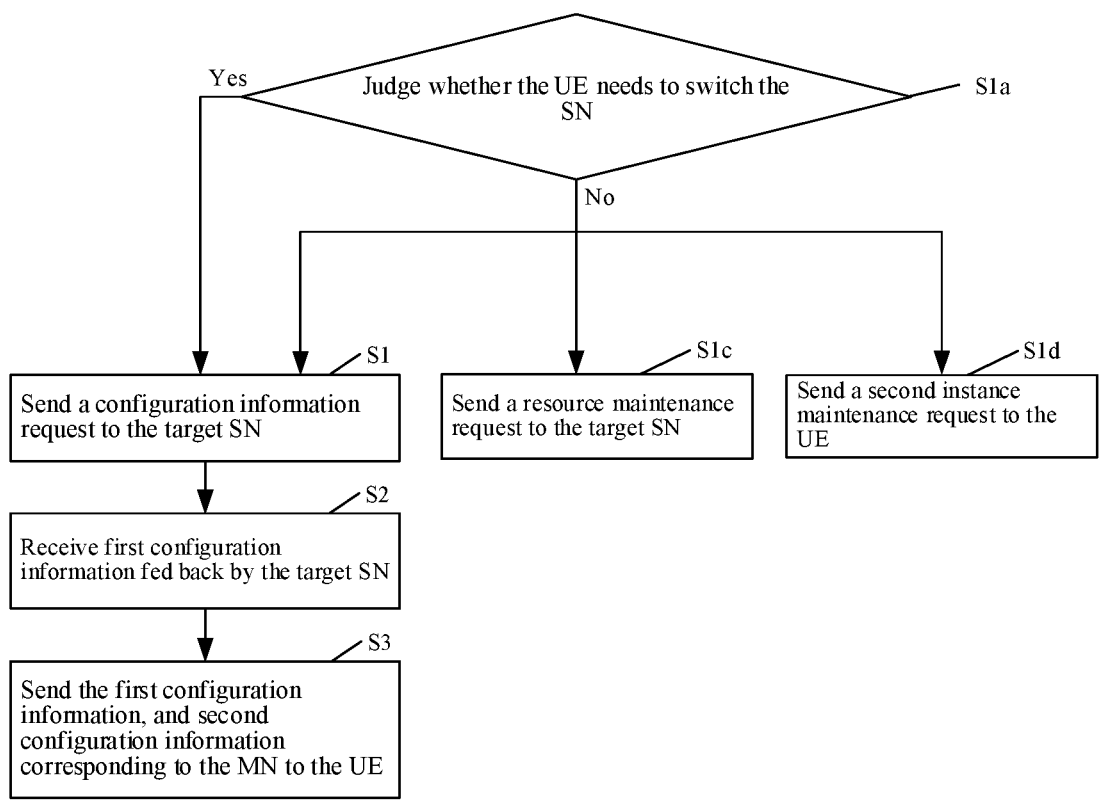
FIG. 3 is a flowchart of yet another dual connection re-establishment method provided by an embodiment of the present disclosure.

FIG. 3 is a flowchart of yet another dual connection re-establishment method provided by an embodiment of the present disclosure. As shown in FIG. 3, the method not only includes the above-mentioned steps S1 to S3, but also includes steps S1a and S1c. S1a is executed prior to S1, and S1c may be executed simultaneously with S1.

At S1a, a judgement is made as to whether the UE needs to switch the SN.

When a determination is made in S1a that the UE does not need to switch the SN, the source SN to which the UE was connected previously is determined as the target SN, and then steps S1c, S1d and S1 are executed simultaneously. When a determination is made in S1a that the UE needs to switch the SN, the target SN may be determined according to the preset SN selection strategy, and then only S1 is executed without executing S1c and S1d.

At S1c, a resource maintenance request is sent to the target SN for the target SN to maintain the UE resource.

At S1d, a second instance maintenance request is sent to the UE.

At S1, a configuration information request is sent to the target SN.

After a determination is made that the target SN is the source SN, steps S1c, S1d and S1 may be executed synchronously. In some embodiments, the resource maintenance request and the configuration information request are sent together in the SN modification request instruction.

After receiving the SN modification request instruction, the source SN maintains the UE instance and uses the original configuration resource in response to the resource maintenance request, generates first configuration information, and feeds back the first configuration information to the MN through the SN modification response instruction. In response to the second instance maintenance request sent by the MN, the UE maintains the source SN instance and does not release the SCG, so as to eliminate the SN secondary admission process during subsequent reconfiguration with the source SN and improve the success rate of dual connection configuration.

It should be noted that the second instance maintenance request may be sent through signaling radio bearers (SRB) established between the UE and the MN.

For the scenario where the SN is unchanged, in the technical schemes of the embodiments of the present disclosure, the UE instance is maintained unchanged by controlling the source SN and use the original configuration resource, so that back transmission is not required, thereby reducing the service interruption delay. At the same time, eliminating the secondary admission process of SN can improve the success rate of dual connection configuration.

After a determination is made that the target SN is not the source SN, only S1 is executed without executing S1c and S1d.

At S2, first configuration information fed back by the target SN is received.

At S3, the first configuration information, and second configuration information corresponding to the MN are sent to the UE.

Figure 4:
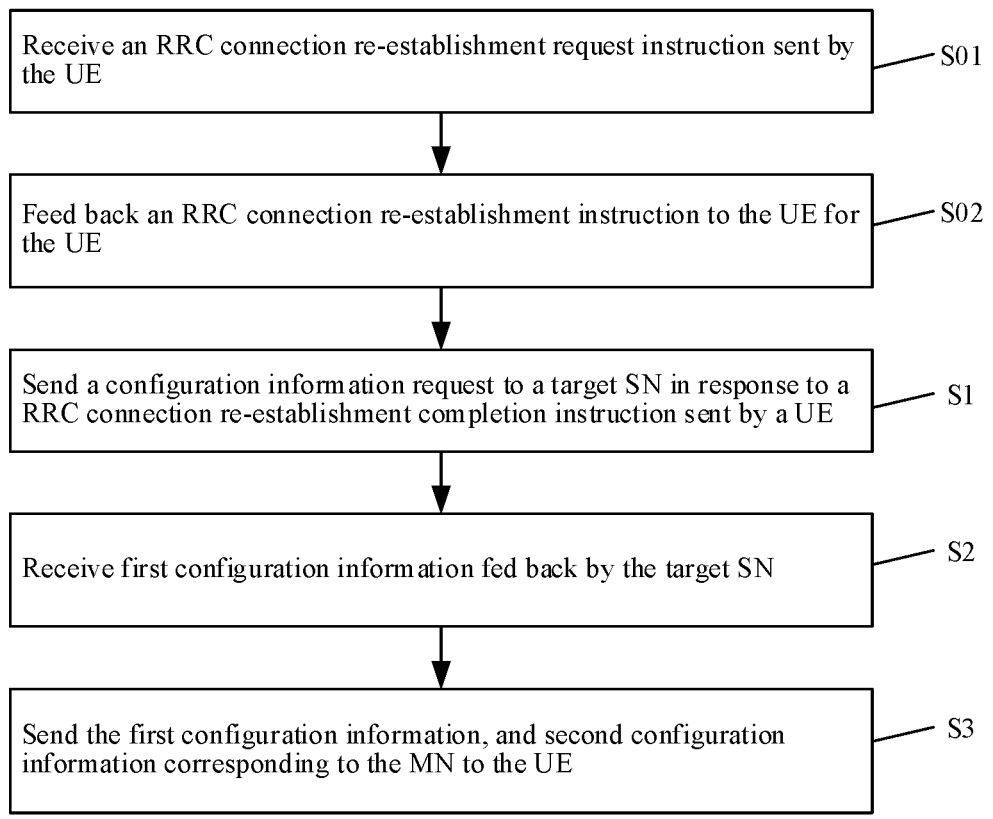
FIG. 4 is a flowchart of still another dual connection re-establishment method provided by an embodiment of the present disclosure.

FIG. 4 is a flowchart of still another dual connection re-establishment method provided by an embodiment of the present disclosure. As shown in FIG. 4, the method not only includes the above-mentioned steps S1 to S3, but also includes steps S01 and S02.

At S01, an RRC connection re-establishment request instruction sent by the UE is received.

When the UE needs to perform dual connection re-establishment, the UE will send an RRC connection re-establishment request to the MN to be connected, and the RRC connection re-establishment request instruction may be sent on SRB0. The MN to be connected may be the source MN to which the UE was connected previously or may be a non-source MN.

At S02, the RRC connection re-establishment instruction is fed back to the UE for the UE to complete RRC connection re-establishment with the MN.

In response to the RRC connection re-establishment request instruction, the MN verifies whether the MN can re-establish a connection with the UE. When the verification is passed, the MN feeds back an RRC connection re-establishment instruction to the UE. The instruction carries a packet data convergence protocol (PDCP), a radio link control (RLC) with which the UE can re-establish the SRB1, and an updated security key, and can restore the instruction and other related content on the SRB1.

After receiving the RRC connection re-establishment instruction, the UE completes the re-establishment process with the MN, and feeds back the RRC connection re-establishment completion instruction to the MN.

At S1, a configuration information request is sent to a target SN.

At S2, first configuration information fed back by the target SN is received.

At S3, the first configuration information, and second configuration information corresponding to the MN are sent to the UE.

Figure 5:
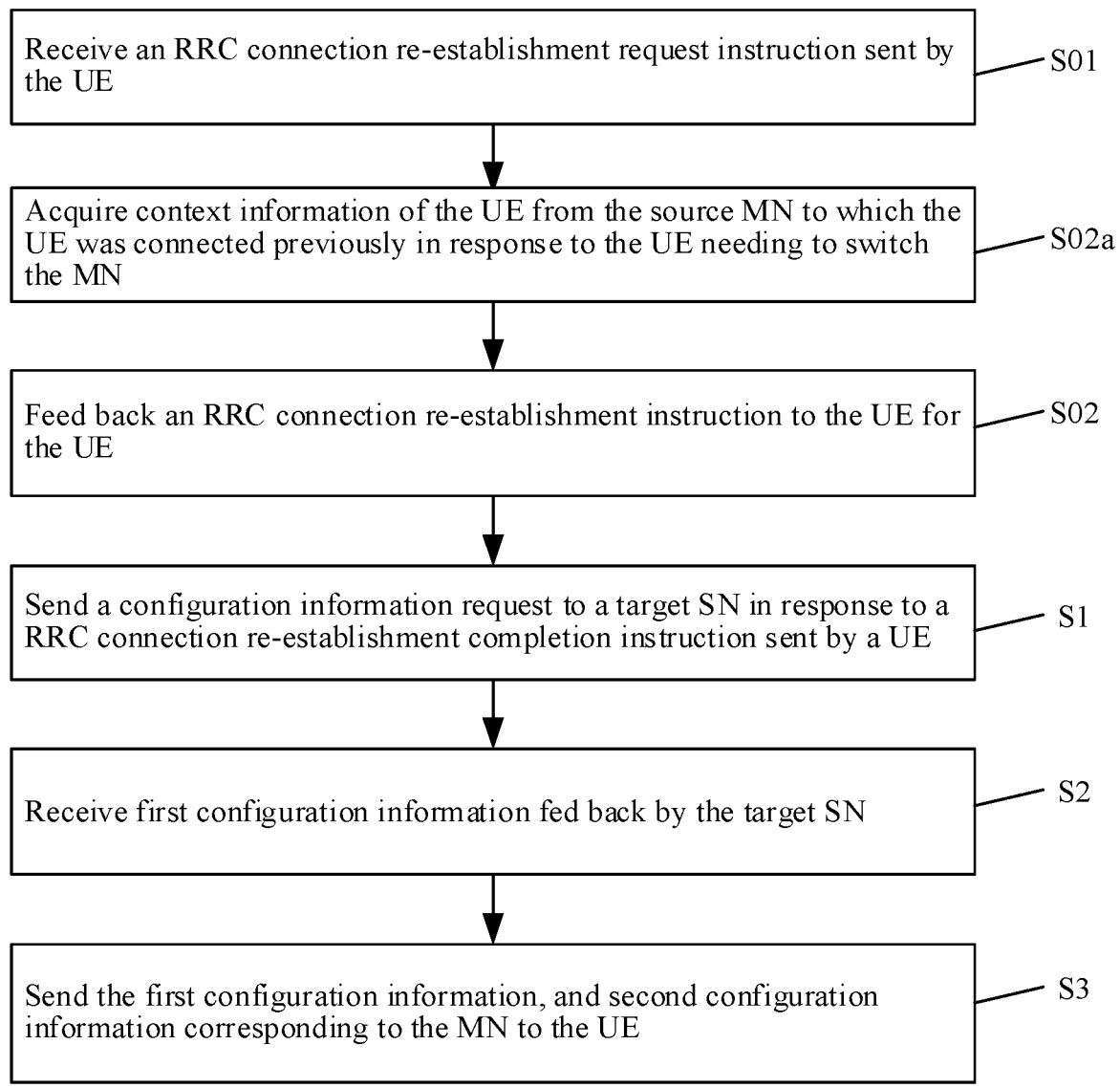
FIG. 5 is a flowchart of still another dual connection re-establishment method provided by an embodiment of the present disclosure.

FIG. 5 is a flowchart of still another dual connection re-establishment method provided by an embodiment of the present disclosure. As shown in FIG. 5, the method not only includes the above-mentioned steps S1 to S3, but also includes steps S01, S02a and S02.

At S01, an RRC connection re-establishment request instruction sent by the UE is received.

In the embodiment, the MN to be connected is a non-source MN. That is, the RRC connection re-establishment request instruction is sent by the UE to the non-source MN.

At S02a, context information of the UE is acquired from the source MN to which the UE was connected previously in response to the UE needing to switch the MN.

According to relevant information recorded in the RRC connection re-establishment request instruction, the non-source MN may determine that the UE needs to switch the MN. At this time, the non-source MN acquires the context information of the UE from the source MN through the node switching process based on an X2 interface. The context information may include network capability information, authentication information, a negotiated security algorithm, key, created connection information, bearer information of the UE, and the like.

The non-source MN verifies whether the non-source MN can re-establish connection with the UE according to the RRC connection re-establishment request instruction and the context information of the UE acquired from the source MN. When the verification is passed, the RRC connection re-establishment instruction is fed back to the UE.

At S02, the RRC connection re-establishment instruction is fed back to the UE for the UE to complete RRC connection re-establishment with the MN.

At S1, a configuration information request is sent to a target SN.

It should be noted that the target SN may be the source SN to which the UE was connected previously, or may be a non-source MN.

At S2, the first configuration information fed back by the target SN is received.

At S3, the first configuration information, and second configuration information corresponding to the MN are sent to the UE.

Figure 10:
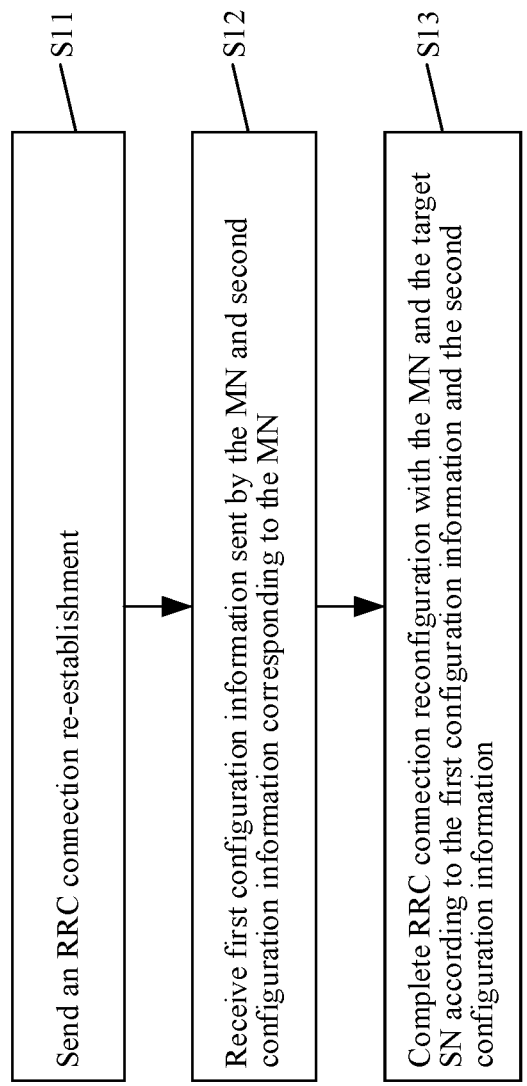
FIG. 10 is a flowchart of a dual connection re-establishment method provided by an embodiment of the present disclosure.

FIG. 10 is a flowchart of a dual connection re-establishment method provided by an embodiment of the present disclosure. As shown in FIG. 10, the execution subject of the dual connection re-establishment method is a UE (UE), and the dual connection re-establishment method includes the steps S11 to S13.

At S11, an RRC connection re-establishment completion instruction is sent to a MN for the MN to send a configuration information request to a target SN and receive first configuration information fed back by the target SN.

At S12, the first configuration information sent by the MN and second configuration information corresponding to the MN are received.

At S13, RRC connection reconfiguration with the MN and the target SN is completed according to the first configuration information and the second configuration information.

It should be noted that different steps in the above-mentioned embodiments may be combined with each other to obtain a new technical scheme, and the combined new technical scheme also fall within the protection scope of the present disclosure.

Several scenarios applicable to the technical schemes of some embodiments of the present disclosure will be described below, which will not limit the technical schemes of the present disclosure.

Figure 6:
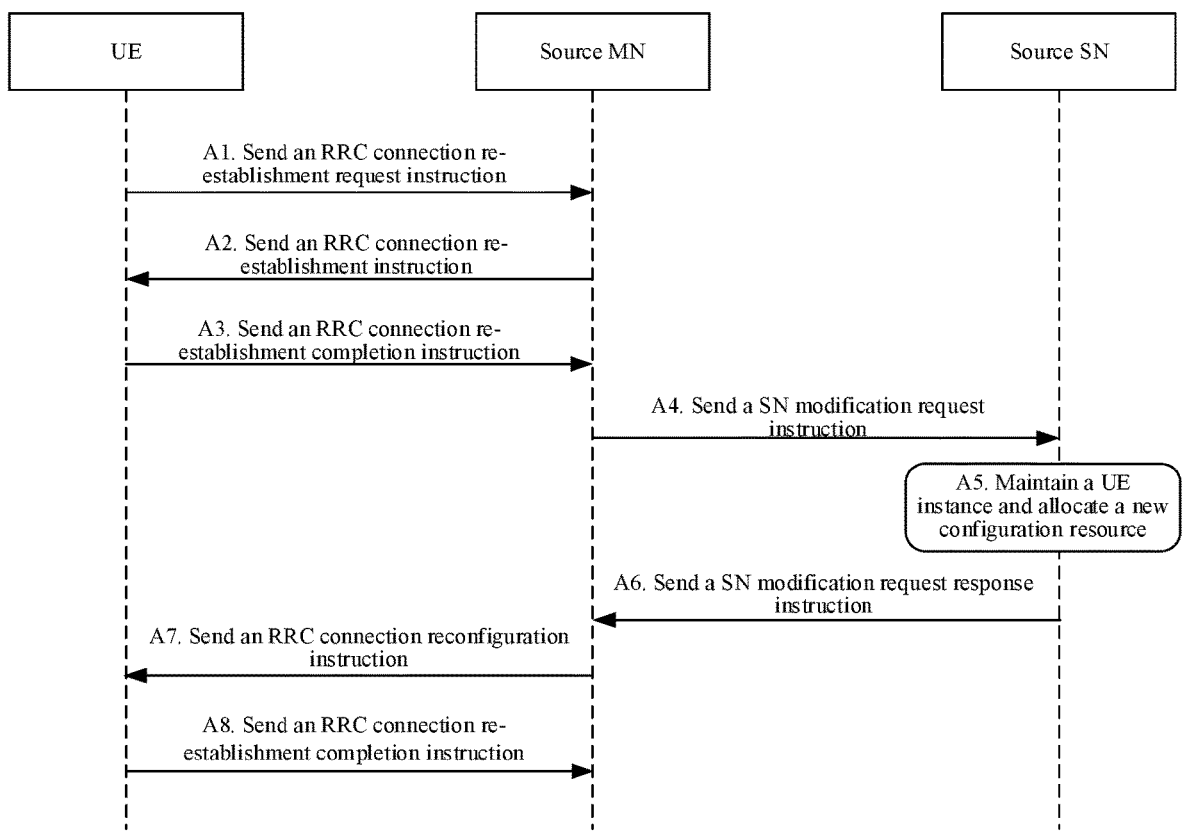
FIG. 6 is a signaling diagram for implementing dual connection re-establishment in an embodiment of the present disclosure.

FIG. 6 is a signaling diagram for implementing dual connection re-establishment in an embodiment of the present disclosure. As shown in FIG. 6, in this dual connection re-establishment scenario, the MN is not switched and the SN is not switched, that is, the MN to which the UE is be connected is the source MN, and the target SN is the source SN. Corresponding scenarios may be as follows:

1) The MN re-establishes connection with a source cell of the source MN, and the signal quality of the source SN is good.
2) The MN re-establishes connection with other cells of the source MN (intra-node cell switching of MN), and the signal quality of the source SN is good.

The process is as follows.

At A1, the UE sends an RRC connection re-establishment request instruction to the source MN.

At A2, the source MN sends an RRC connection re-establishment instruction to the UE.

At A3, the UE sends an RRC connection re-establishment completion instruction to the source MN.

At A4, the source MN sends a SN modification request instruction to the source SN, where the SN modification request instruction contains the first instance maintenance request and the configuration information request.

At A5, the source SN maintains the UE instance and allocates a new configuration resource.

At A6, the source SN sends a SN modification request response instruction to the source MN, where the SN modification request response instruction contains the first configuration information of the source SN.

At A7, the source MN sends an RRC connection reconfiguration instruction to the UE, where the RRC connection reconfiguration instruction contains the first configuration information corresponding to the source SN and the second configuration information corresponding to the source MN.

At A8, the UE completes the reconfiguration with the source SN and the source MN according to the first configuration information and the second configuration information, and sends an RRC connection reconfiguration completion instruction to the source MN.

Figure 7:
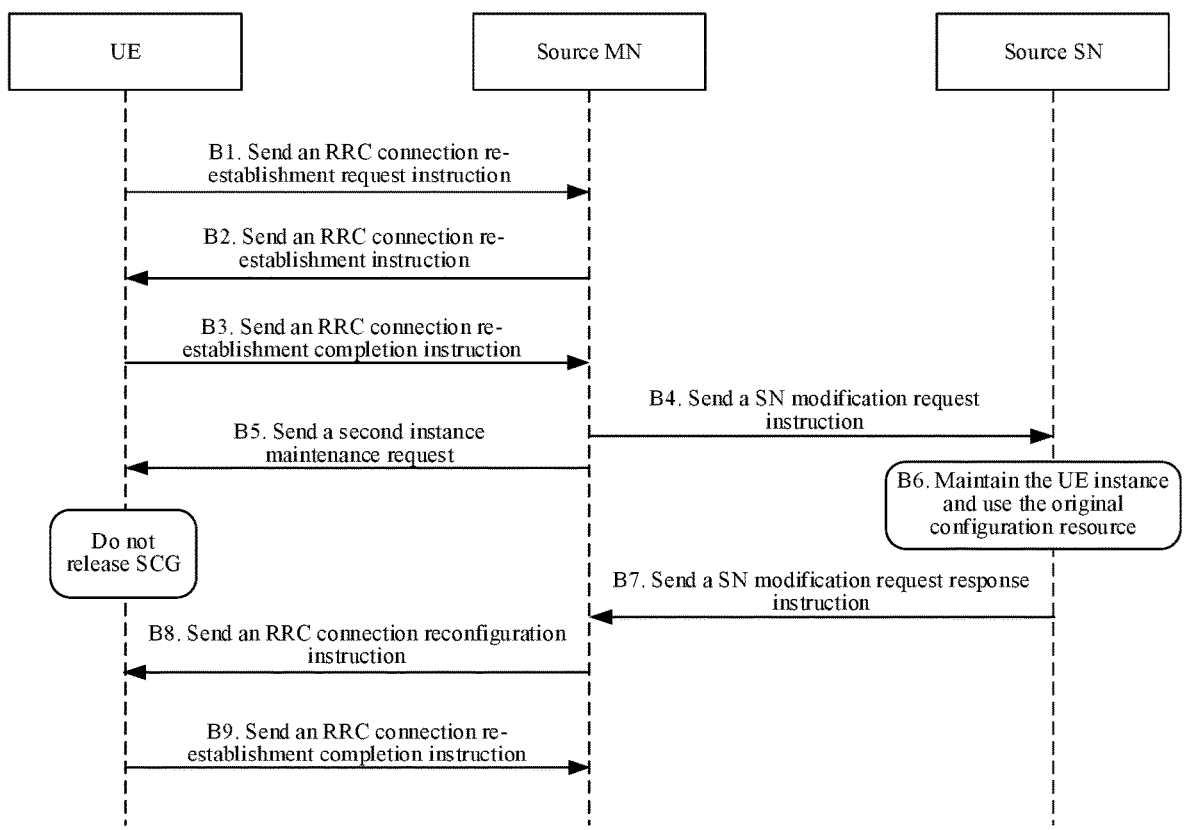
FIG. 7 is a signaling diagram for implementing dual connection re-establishment in an embodiment of the present disclosure.

FIG. 7 is a signaling diagram for implementing dual connection re-establishment in an embodiment of the present disclosure. As shown in FIG. 7, the applicable scenario of FIG. 7 is the same as that in FIG. 6, and details are not repeated here.

The process is as follows.

At B1, the UE sends an RRC connection re-establishment request instruction to the source MN.

At B2, the source MN sends an RRC connection re-establishment instruction to the UE.

At B3, the UE sends an RRC connection re-establishment completion instruction to the source MN.

At B4, the source MN sends a SN modification request instruction to the source SN, where the SN modification request instruction contains a resource maintenance request and a configuration information request.

At B5, the source MN sends a second instance maintenance request to the UE for the UE to maintain the source SN instance without releasing the SCG.

At B6, the source SN maintains the UE instance and uses the original configuration resource.

At B7, the source SN sends a SN modification request response instruction to the source MN, where the SN modification request response instruction contains the first configuration information of the source SN.

At B8, the source MN sends an RRC connection reconfiguration instruction to the UE, where the RRC connection reconfiguration instruction contains the first configuration information corresponding to the source SN and the second configuration information corresponding to the source MN.

At B9, the UE completes the reconfiguration with the source SN and the source MN according to the first configuration information and the second configuration information, and sends an RRC connection reconfiguration completion instruction to the source MN.

Figure 8:
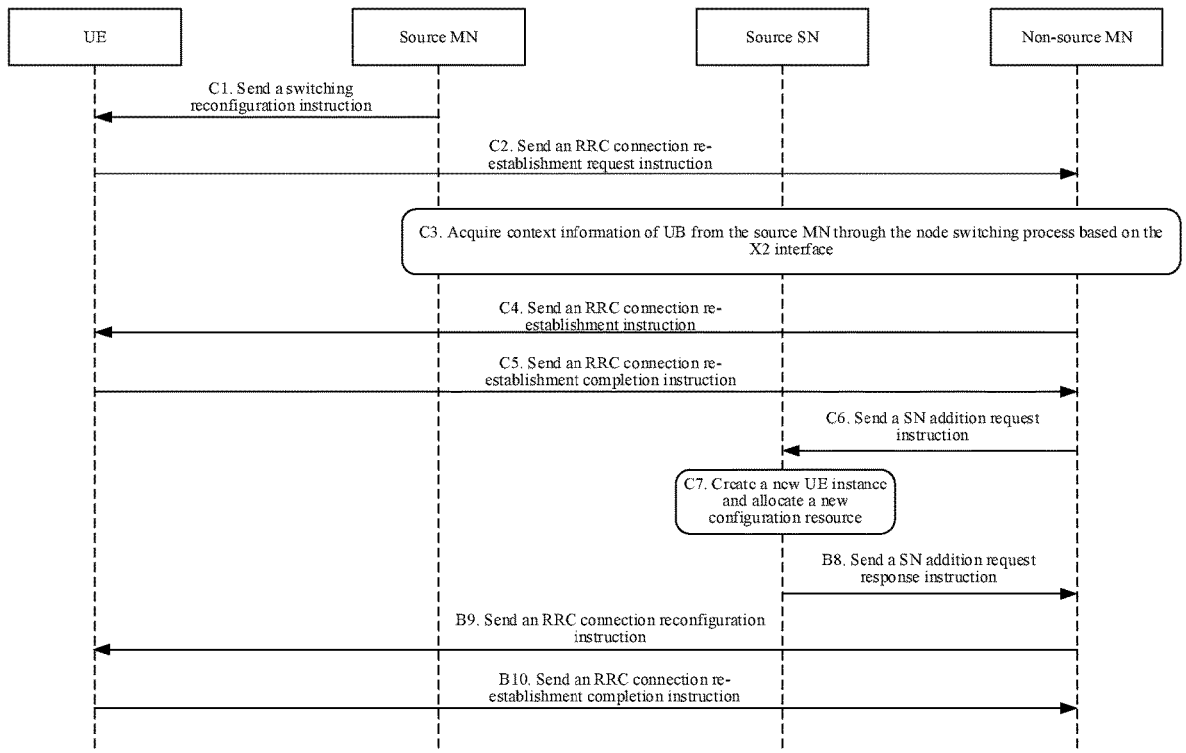
FIG. 8 is a signaling diagram for implementing dual connection re-establishment in an embodiment of the present disclosure.

FIG. 8 is a signaling diagram for implementing dual connection re-establishment in an embodiment of the present disclosure. As shown in FIG. 8, in the dual connection re-establishment scenario, the MN is switched but the SN is not switched, that is, the target MN to which the UE is to be connected is a non-source MN, and the target SN is the source SN. A corresponding scenario is as follows:

1) The MN re-establishes connection to a cell of the non-source MN, and the non-source MN determines that the target SN is the source SN (for example, in the scenario where the UE moves).

The process is as follows.

At C1, the source MN triggers node switching and sends a switching reconfiguration instruction to the UE.

At C2, the UE sends an RRC connection re-establishment request instruction to the non-source MN.

At C3, the non-source MN acquires context information of the UE from the source MN through the node switching process based on an X2 interface, and executes a corresponding verification process.

At C4, the non-source MN sends an RRC connection re-establishment instruction to the UE.

At C5, the UE sends an RRC connection re-establishment completion instruction to the non-source MN.

At C6, the non-source MN sends a SN addition request instruction to the source SN, where the SN addition request instruction contains a configuration information request.

At C7, if the SN addition request instruction does not contain the second instance maintenance request and the resource maintenance request, the source SN creates a new instance and allocates a new configuration resource.

At C8, the source SN sends a SN addition request response instruction to the non-source MN, where the SN addition request response instruction contains the first configuration information of the source SN.

At C9, the source MN sends an RRC connection reconfiguration instruction to the UE, where the RRC connection reconfiguration instruction contains the first configuration information corresponding to the source SN and the second configuration information corresponding to the non-source MN.

At C10, the UE completes the reconfiguration with the source SN and the non-source MN according to the first configuration information and the second configuration information, and sends an RRC connection reconfiguration completion instruction to the source MN.

Other application scenarios to which the technical schemes of the embodiments of the present disclosure are applicable are not described here by examples.

An embodiment of the present disclosure further provides a readable storage medium storing a program which, when executed by a processor, causes the processor to carry out the dual connection re-establishment method provided by the foregoing embodiments.

Figure 9:
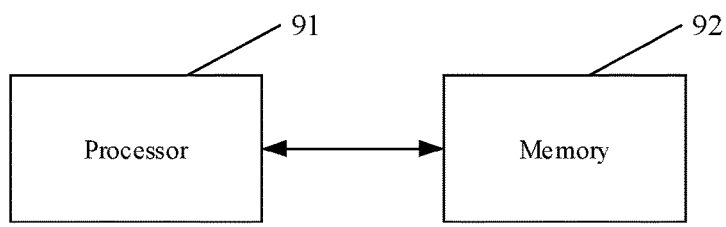
FIG. 9 is a schematic structural diagram of a node provided by an embodiment of the present disclosure.

An embodiment of the present disclosure further provides a node, as shown in FIG. 9. The node includes: one or more processors 91, and a memory 92 storing one or more programs which, when executed by the one or more processors 91, cause the one or more processors 91 to carry out the dual connection re-establishment method provided by the foregoing embodiments.

The embodiments of the present disclosure provide a dual connection re-establishment method, a readable storage medium, and a node. When the UE completes the RRC connection re-establishment with the MN, the MN sends a configuration information request to the target SN to provide corresponding first configuration information, and then sends the first configuration information corresponding to the SN and the second configuration information corresponding to the MN to the UE for the UE to establish a connection with the MN and SN at one time. That is, the dual connection is configured at one time in the re-establishment process, thus effectively reducing the time spent in the dual connection re-establishment process, reducing the interruption delay, and ensuring the throughput of users.

In addition, when the target SN is the source SN to which the UE was connected previously, by sending a request to the source SN to control the SN to maintain the UE instance or the original configuration resource, the service interruption delay can be further reduced, and the success rate of dual connection configuration can be improved.

Those having ordinary skill in the art can understand that all or some steps in the methods disclosed above, and functional modules/units in an apparatus may be implemented as software, firmware, hardware, and appropriate combinations thereof. In a hardware implementation, the division between functional modules/units mentioned in the above description does not necessarily correspond to the division of physical components. For example, one physical component may have multiple functions, or one function or one step may be executed by several physical components in cooperation. Some or all of the physical components may be implemented as software executed by a processor, such as a central processing unit, a digital signal processor or a microprocessor, or as hardware, or as an integrated circuit, such as an application specific integrated circuit. Such software may be distributed on a computer-readable medium, which may include a computer storage medium (or a non-transitory medium) and a communication medium (or a transitory medium). As is known to those having ordinary skill in the art, the term "computer storage medium" includes a volatile and nonvolatile, removable and non-removable medium implemented in any method or technology for storing information, such as a computer readable instruction, a data structure, a program module or other data. The computer storage medium includes, but are not limited to, RAM, ROM, EEPROM, flash memory or other memory technologies, CD-ROM, digital versatile disk (DVD) or other optical disk storage, magnetic box, magnetic tape, magnetic disk storage or other magnetic storage apparatuses, or any other medium that can be used to store desired information and can be accessed by a computer. In addition, as is known to those having ordinary skill in the art, a communication medium usually contains a computer readable instruction, a data structure, a program module or other data in modulated data signals such as carrier waves or other transmission mechanisms, and may include any information delivery medium.

Some embodiments have been disclosed herein, and although specific terms are used, these terms are only intended for general illustration and should only be construed to have general illustrative meaning, and are not intended for limitation. In some instances, it is obvious to those having ordinary skill in the art that the features, characteristics and/or elements described in conjunction with a particular embodiment may be used alone or in combination with the features, characteristics and/or elements described in conjunction with other embodiments, unless otherwise explicitly stated. Therefore, it will be understood by those having ordinary skill in the art that various changes in form and details may be made without departing from the scope of the present disclosure as set forth by the appended claims.

The invention claimed is:

1. A dual connection re-establishment method, which is applied to a master node (MN) side, the method comprising:
    sending a configuration information request to a target secondary node (SN) in response to a radio resource control (RRC) connection re-establishment completion instruction sent by a user equipment (UE);
    receiving first configuration information fed back by the target SN; and
    sending the first configuration information, and second configuration information corresponding to the MN to the UE for the UE to complete the RRC connection reconfiguration with the MN and the target SN according to the first configuration information and the second configuration information;
    prior to sending a configuration information request to a target SN, the method further comprising:
    determining a source SN to which the UE was connected previously as the target SN in response to the UE not needing to switch the SN;
    wherein in response to the source SN being determined as the target SN, sending a configuration information request to a target SN comprises:
    sending the configuration information request and a first instance maintenance request to the target SN for the target SN to feed back the first configuration information and maintain a UE instance.

2. The method of claim 1, wherein:
    the configuration information request is sent in a SN modification request instruction; or
    the configuration information request is sent in a SN addition request instruction.

3. The method of claim 1, wherein the first configuration information and the second configuration information are sent in an RRC connection reconfiguration instruction.

4. The method of claim 1, wherein the first instance maintenance request is sent in the SN modification request instruction.

5. The method of claim 1, wherein:
    in response to the source SN being determined as the target SN, sending a configuration information request to a target SN comprises:
    sending the configuration information request and a resource maintenance request to the target SN for the target SN to feed back the first configuration information and maintain a UE resource; and
    prior to sending the first configuration information, and second configuration information corresponding to the MN to the UE, the method further comprises:
    sending a second instance maintenance request to the UE for the UE to maintain a source SN instance.

6. The method of claim 5, wherein the resource maintenance request is sent in the SN modification request instruction.

7. The method of claim 1, prior to sending a configuration information request to a target SN, the method further comprising:
receiving an RRC connection re-establishment request instruction sent by the UE; and
feeding back an RRC connection re-establishment instruction to the UE for the UE to complete RRC connection re-establishment with the MN.

8. The method of claim 7, after receiving an RRC connection re-establishment request instruction sent by the UE and prior to feeding back an RRC connection re-establishment instruction to the UE, the method further comprising:
acquiring context information of the UE from a source MN to which the UE was connected previously in response to the UE needing to switch the MN.

9. A non-transitory computer-readable storage medium storing a program which, when executed by a processor, causes the processor to carry out the method of claim 1.

10. A node, comprising:
one or more processors;
a memory storing one or more programs; wherein
the one or more programs, when executed by the one or more processors, cause the one or more processors to carry out a dual connection re-establishment method, which is applied to a master node (MN) side, the method comprising:
sending a configuration information request to a target secondary node (SN) in response to a radio resource control (RRC) connection re-establishment completion instruction sent by a user equipment (UE);
receiving first configuration information fed back by the target SN; and
sending the first configuration information, and second configuration information corresponding to the MN to the UE for the UE to complete the RRC connection reconfiguration with the MN and the target SN according to the first configuration information and the second configuration information;
prior to sending a configuration information request to a target SN, the method further comprising:
determining a source SN to which the UE was connected previously as the target SN in response to the UE not needing to switch the SN;
wherein in response to the source SN being determined as the target SN, sending a configuration information request to a target SN comprises:
sending the configuration information request and a first instance maintenance request to the target SN for the target SN to feed back the first configuration information and maintain a UE instance.

11. A dual connection re-establishment method, which is applied to a UE side, the method comprising:
sending a radio resource control (RRC) connection re-establishment completion instruction to a master node (MN) for the MN to send a configuration information request to a target secondary node (SN) and receive first configuration information fed back by the target SN;
receiving the first configuration information sent by the MN and second configuration information corresponding to the MN; and
completing RRC connection reconfiguration with the MN and the target SN according to the first configuration information and the second configuration information;
prior to sending a configuration information request to a target SN, the method further comprising:
determining a source SN to which the UE was connected previously as the target SN in response to the UE not needing to switch the SN;
wherein in response to the source SN being determined as the target SN, sending a configuration information request to a target SN comprises:
sending the configuration information request and a first instance maintenance request to the target SN for the target SN to feed back the first configuration information and maintain a UE instance.

12. A non-transitory computer-readable storage medium storing a program which, when executed by a processor, causes the processor to carry out the method of claim 11.

* * * * *